(12) United States Patent
Mevius et al.

(10) Patent No.: US 8,281,803 B2
(45) Date of Patent: Oct. 9, 2012

(54) BALANCED PORT HOUSING WITH INTEGRATED FLOW CONDITIONING

(75) Inventors: Jason S. Mevius, McKinney, TX (US); Gregory L. Foust, Plano, TX (US)

(73) Assignee: Fisher Controls International LLC, Marshalltown, IA (US)

(*) Notice: Subject to any disclaimer, the term of this patent is extended or adjusted under 35 U.S.C. 154(b) by 700 days.

(21) Appl. No.: 12/105,887

(22) Filed: Apr. 18, 2008

(65) Prior Publication Data

US 2009/0261281 A1    Oct. 22, 2009

(51) Int. Cl.
*F16K 31/36* (2006.01)

(52) U.S. Cl. ........... 137/505.46; 137/505.47; 137/484.8; 251/58

(58) Field of Classification Search ............ 251/58, 251/61, 62, 118–127; 137/505.46, 505.47, 137/484.6, 484.8
See application file for complete search history.

(56) References Cited

U.S. PATENT DOCUMENTS

| | | | | |
|---|---|---|---|---|
| 1,945,834 | A | * | 2/1934 | Terry ................... 137/454.5 |
| 2,042,781 | A | | 6/1936 | Grove |
| 2,261,364 | A | | 11/1941 | Grove |
| 2,273,111 | A | | 2/1942 | Kindl |
| 2,599,577 | A | * | 6/1952 | Norgren .................. 137/484.8 |
| 2,619,983 | A | | 12/1952 | Roberts |
| 2,624,980 | A | | 1/1953 | Hughes |
| 2,664,674 | A | * | 1/1954 | Niesemann .............. 137/116.5 |
| 3,086,548 | A | * | 4/1963 | Galiger et al. ........... 137/484.8 |
| 3,392,749 | A | * | 7/1968 | Gneiding et al. ........ 137/484.6 |
| 3,424,194 | A | | 1/1969 | Kruzan et al. |
| 3,542,052 | A | | 11/1970 | Irwin |
| 3,722,536 | A | | 3/1973 | Hill et al. |
| 3,742,972 | A | | 7/1973 | Hughes |
| 4,176,677 | A | | 12/1979 | Hughes |

(Continued)

FOREIGN PATENT DOCUMENTS

DE    3532751 A1    3/1987

(Continued)

OTHER PUBLICATIONS

Emerson Process Management, "64 Series Pressure Reducing Regulator," Natural Gas Regulators Application Guide—Edition V, pp. 367-379 (2005).

(Continued)

*Primary Examiner* — John K Fristoe, Jr.
*Assistant Examiner* — Marina Tietjen
(74) *Attorney, Agent, or Firm* — Marshall, Gerstein & Borun LLP (57) ABSTRACT

A gas regulator includes an actuator, a valve, and a balanced port housing disposed within the valve for flow conditioning to convert turbulent flow within the valve to laminar flow when the fluid reaches the sensing point of a Pitot tube disposed within the outlet of the valve. The balancing port housing includes an opening through a sidewall and disposed between a valve port of the valve and the outlet. The opening may include a partial obstruction, such as baffles or a mesh screen over which the fluid flows to convert the turbulent flow to laminar flow. The regulator may further include balanced trim having a balancing diaphragm in fluid communication with the upstream pressure to apply a force to a valve disc of the valve in the opposite direction of the force applied to the valve disc by the upstream pressure so that the upstream pressure does not affect the regulator's control of the downstream pressure.

23 Claims, 9 Drawing Sheets

U.S. PATENT DOCUMENTS

| | | | |
|---|---|---|---|
| 5,161,576 A * | 11/1992 | Hekkert et al. | 137/614.18 |
| 5,285,810 A | 2/1994 | Gotthelf | |
| 5,586,569 A * | 12/1996 | Hanning et al. | 137/116.5 |
| 6,192,912 B1 | 2/2001 | Butler et al. | |
| 6,354,319 B1 | 3/2002 | Mooney | |
| 6,796,326 B2 * | 9/2004 | Bayer | 137/505.18 |
| 6,886,583 B2 | 5/2005 | Matsushima et al. | |
| 6,923,197 B2 | 8/2005 | Vitale | |
| 2004/0187930 A1 | 9/2004 | Hawkins et al. | |
| 2005/0011554 A1 | 1/2005 | Davila et al. | |
| 2006/0086919 A1 * | 4/2006 | Yang | 251/129.15 |
| 2007/0272316 A1 * | 11/2007 | Zecchi et al. | 137/625.33 |
| 2008/0258096 A1 | 10/2008 | Hawkins | |

FOREIGN PATENT DOCUMENTS

| | | |
|---|---|---|
| DE | 40 12 801 A1 | 10/1991 |
| DE | 295 06 395.5 U1 | 6/1995 |
| DE | 198 21 292 A1 | 11/1999 |
| FR | 2 451 597 A1 | 10/1980 |
| WO | WO-99/23544 A1 | 5/1999 |

OTHER PUBLICATIONS

Emerson Process Management, "66 Series Pressure Reducing Regulators," Natural Gas Regulators Application Guide—Edition V, pp. 29-72 (2005).

Emerson Process Management, "Principles of Direct-Operated Regulators," Natural Gas Regulators Application Guide—Edition V, pp. 471-476 (2005).

Emerson Process Management, "Principles of Series Regulation and Monitor Regulators," Natural Gas Regulators Application Guide—Edition V, pp. 493-495 (2005).

Emerson Process Management, "REGAL 2 Series Pressure Reducing Regulator," Natural Gas Regulators Application Guide—Edition V, pp. 239-245 (2005).

Emerson Process Management, "S200 Series Pressure Reducing Regulators," Natural Gas Regulators Application Guide—Edition V, pp. 259-272 (2005).

Emerson Process Management, "S300 Series Pressure Reducing Regulators," Natural Gas Regulators Application Guide—Edition V, pp. 289-306 (2005).

Emerson Process Management, "Selecting and Sizing Pressure Reducing Regulators," Natural Gas Regulators Application Guide—Edition V, pp. 479-483 (2005).

Emerson Process Management, "Type 63EG Relief Valve/Backpressure Regulator," Natural Gas Regulators Application Guide—Edition V, pp. 329-340 (2005).

Emerson Process Management, "Type EZL Pressure Reducing Regulator for Low Differential Pressure Applications," Natural Gas Regulators Application Guide—Edition V, pp. 169-179 (2005).

International Search Report and Written Opinion for Application No. PCT/US2009/041257, dated Aug. 14, 2009.

International Search Report and Written Opinion for Application No. PCT/US2008/060645, dated Apr. 17, 2008.

International Preliminary Report on Patentability for Application No. PCT/US2008/060645, dated Jun. 22, 2010.

International Search Report for PCT/US2009/041001, dated Aug. 25, 2011.

Written Opinion for PCT/US2009/041001, dated Aug. 25, 2011.

Australian Office Action for Application No. 2008242823, dated Aug. 25, 2011.

International Preliminary Report on Patentability for Application No. PCT/US2009/041001, dated Aug. 30, 2011.

International Preliminary Report on Patentability for Application No. PCT/US2009/041257, dated Oct. 26, 2010.

International Preliminary Report on Patentability for Application No. PCT/US2009/041259, dated Oct. 26, 2010.

International Search Report and Written Opinion for Application No. PCT/US2009/041259, dated Oct. 15, 2010.

* cited by examiner

BALANCED PORT HOUSING WITH INTEGRATED FLOW CONDITIONING

FIELD OF THE INVENTION

The present invention relates to gas regulators, and more particularly, to gas regulators having actuators with closed-loop control.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a balanced trim to improve the reaction of the gas regulator to variations in the downstream pressure. The balanced trim is adapted to reduce the influence of the upstream pressure on the performance of the gas regulator. The upstream pressure is placed in fluid communication with a balancing diaphragm to apply a force to the control element of the gas regulator in the opposite direction as the force of the downstream pressure. Accordingly, as the upstream pressure varies, a corresponding force is applied to balance the force created by the upstream pressure as described further below so that the gas regulator acts in response to the downstream pressure only.

Figure 1:
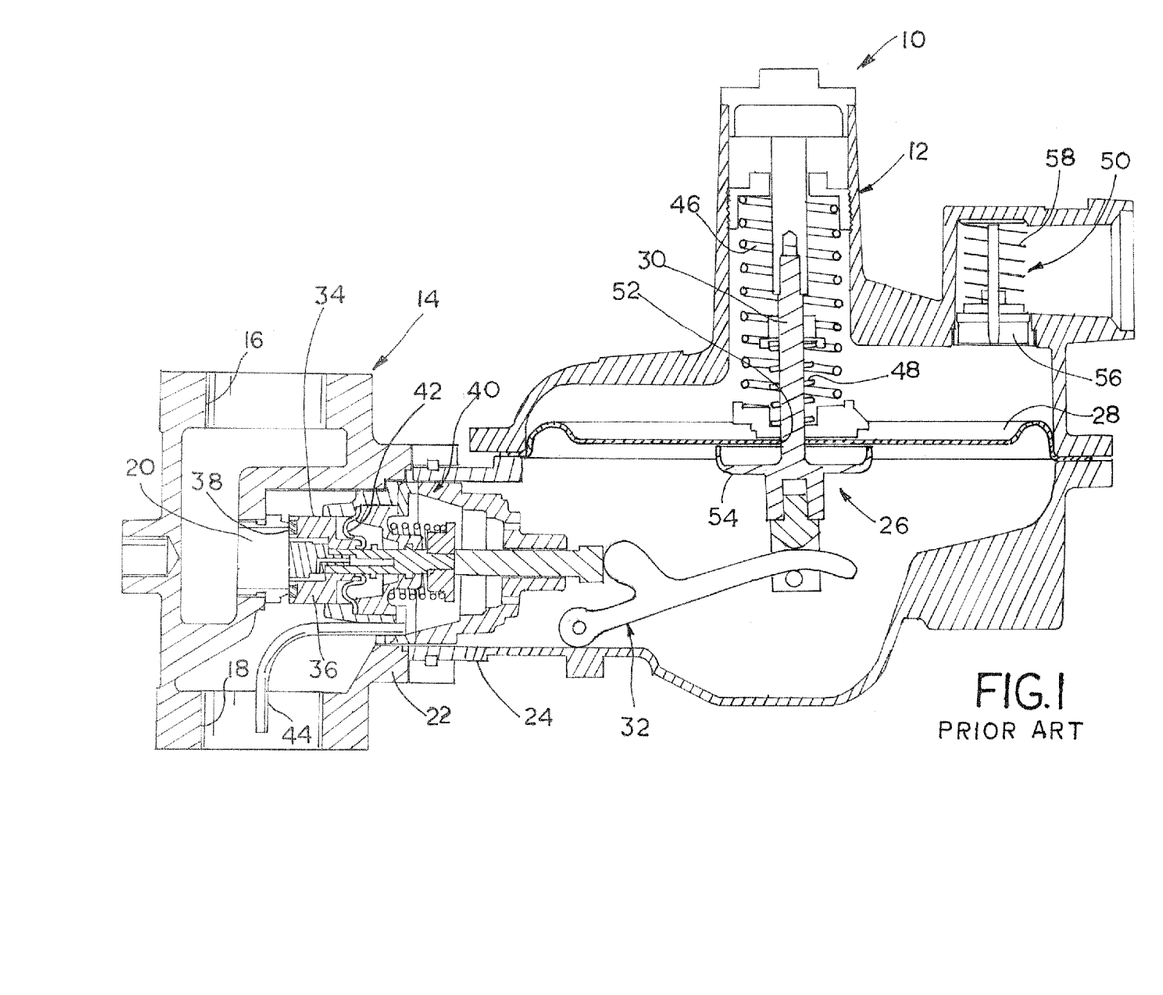
FIG. 1 is a side cross-sectional view of a conventional gas regulator with balanced trim in a closed position.
Figure 2:
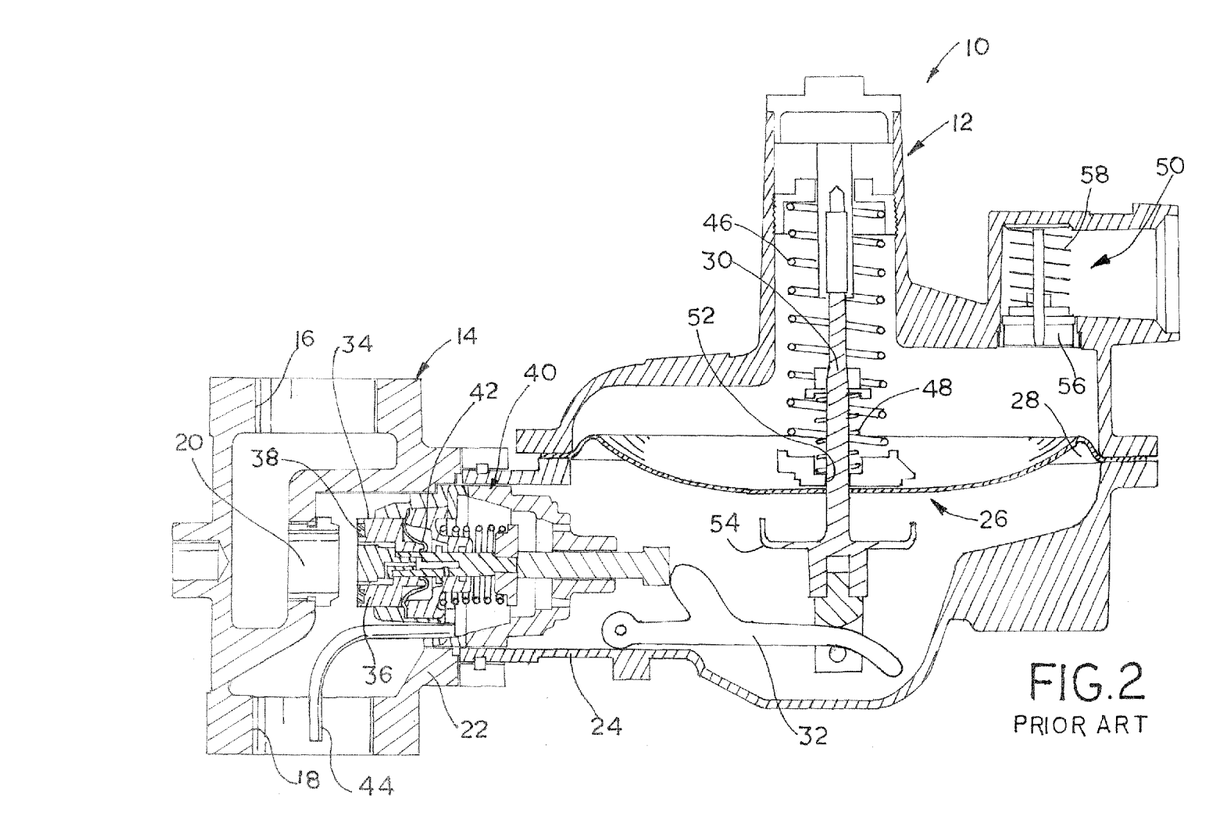
FIG. 2 is a side cross-sectional view of the gas regulator of FIG. 1 in a full open position.

FIGS. 1 (closed position) and 2 (full open position) depict one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 20 disposed between the inlet 16 and the outlet 18. Gas must pass through the valve port 20 to travel between the inlet 16 and the outlet 18 of the regulator valve 14.

The actuator 12 is coupled to the regulator valve 14 to ensure that the pressure at the outlet 18 of the regulator valve 14, i.e., the outlet pressure, is in accordance with a desired outlet or control pressure, known as the setpoint pressure. The actuator 12 is therefore in fluid communication with the regulator valve 14 via a valve mouth 22 and an actuator mouth 24. The actuator 12 includes a control assembly 26 for sensing and regulating the outlet pressure of the regulator valve 14. Specifically, the control assembly 26 includes a diaphragm 28, a piston 30, and a control arm 32 having a valve disc 34 operatively connected thereto. The conventional balanced trim valve disc 34 includes a generally cylindrical body 36 and a sealing insert 38 fixed to the body 36. The control assembly 26 may also include a balanced trim assembly 40 with a balancing diaphragm 42 to offset the force applied to the valve disc 34 by the upstream pressure. The actuator diaphragm 28 senses the outlet pressure of the regulator valve 14 via a Pitot tube 44 placing the outlet 18 in fluid communication with the interior of the actuator 12 and a bottom-side of the actuator diaphragm 28. The control assembly 26 further includes a control spring 46 in engagement with a top-side of the diaphragm 28 to offset the sensed outlet pressure. Accordingly, the desired outlet pressure, which may also be referred to as the control pressure or the actuator setpoint pressure, is set by the selection of the control spring 46.

Figure 3:
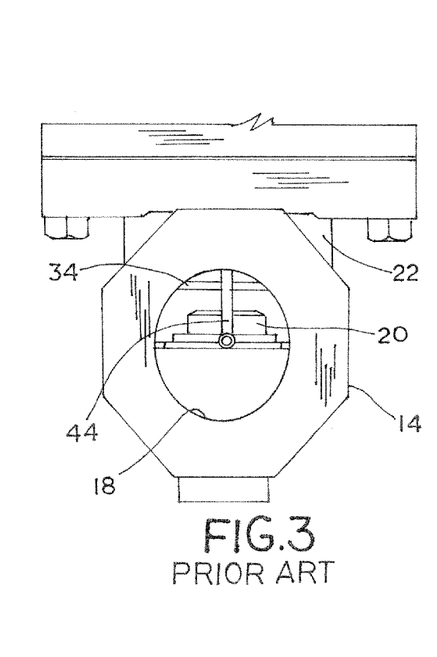
FIG. 3 is an end view through the outlet of the gas regulator of FIG. 2.

The diaphragm 28 is operably coupled to the control arm 32, and therefore, the valve disc 34 via the piston 30, controls the opening of the regulator valve 14 based on the sensed outlet pressure. For example, when an end user operates an appliance, such as a furnace, for example, that places a demand on the gas distribution system downstream of the regulator 10, the outlet flow increases, thereby decreasing the outlet pressure. Accordingly, the diaphragm 28 senses this decreased outlet pressure. This allows the control spring 46 to expand and move the piston 30 and the right-side of the control arm 32 downward, relative to the orientation of FIG. 1. This displacement of the control arm 32 moves the valve disc 34 away from the valve port 20 to open the regulator valve 14. FIGS. 2 and 3 depict the valve disc 34 in a normal, open operating position. So configured, the appliance may draw gas through the valve port 20 toward the outlet 18 of the regulator valve 14.

In the conventional regulator 10, the control spring 46 inherently generates less force as it expands towards an uncompressed length when displacing the control arm 32 to open the valve port 20. Additionally, as the control spring 46 expands, the diaphragm 28 deforms, which increases the area of the diaphragm 28. The decreased force supplied by the control spring 46 and the increased area of the diaphragm 28 in this operational scenario combine to create a regulator response wherein the force provided by the control spring 46 cannot adequately balance the force generated by the diaphragm 28 thereby resulting in an outlet control pressure that is less than that originally set by the user. This phenomenon is known as "droop." When "droop" occurs, the outlet pressure decreases below its set control pressure and the regulator 10 may not function as intended.

In the conventional regulator 10 depicted in FIGS. 1-3, the control assembly 26 further functions as a relief valve, as mentioned above. Specifically, the control assembly 26 also includes a relief spring 48 and a release valve 50. The diaphragm 28 includes an opening 52 through a central portion thereof and the piston 30 includes a sealing cup 54. The relief spring 48 is disposed between the piston 30 and the diaphragm 28 to bias the diaphragm 28 against the sealing cup 54 to close the opening 52, during normal operation. Upon the occurrence of a failure such as a break in the control arm 32, the control assembly 26 is no longer in direct control of the valve disc 34 and inlet flow will move the valve disc 34 to an extreme open position. This allows a maximum amount of gas to flow into the actuator 12. Thus, as the gas fills the actuator 12, pressure builds against the diaphragm 28 forcing the diaphragm 28 away from the sealing cup 54, thereby exposing the opening 52. The gas therefore flows through the opening 52 in the diaphragm 28 and toward the release valve 50. The release valve 50 includes a valve plug 56 and a release spring 58 biasing the valve plug 56 into a closed position. Upon the pressure within the actuator 12 and adjacent the release valve 50 reaching a predetermined threshold pressure, the valve plug 56 displaces upward against the bias of the release spring 58 and opens, thereby exhausting gas into the atmosphere and reducing the pressure in the regulator 10.

In most implementations, it is preferable to sense the downstream pressure as shown in FIGS. 1-3 within the outlet 18. The Pitot tube 44 as positioned provides rapid feedback of the downstream pressure to the control assembly 26 and eliminates the need for an external downstream pressure feedback line. A regulator's performance is dictated by the volume of a fluid that can be transferred downstream while maintaining a designated outlet pressure. The smoother the fluid flow before the sense point of the Pitot tube 44, the more accurate the pressure sensed by the Pitot tube 44 and provided to the control assembly 26. In the regulator 10 as shown, however, the fluid passing through the valve port 20 is dispersed within the valve mouth 22 and outlet 18 such that the fluid experiences and maintains turbulent flow as it passes the sense point of the Pitot tube 44 under typical conditions. The turbulent flow leads to substandard sensing of the downstream fluid pressure.

Figure 4:
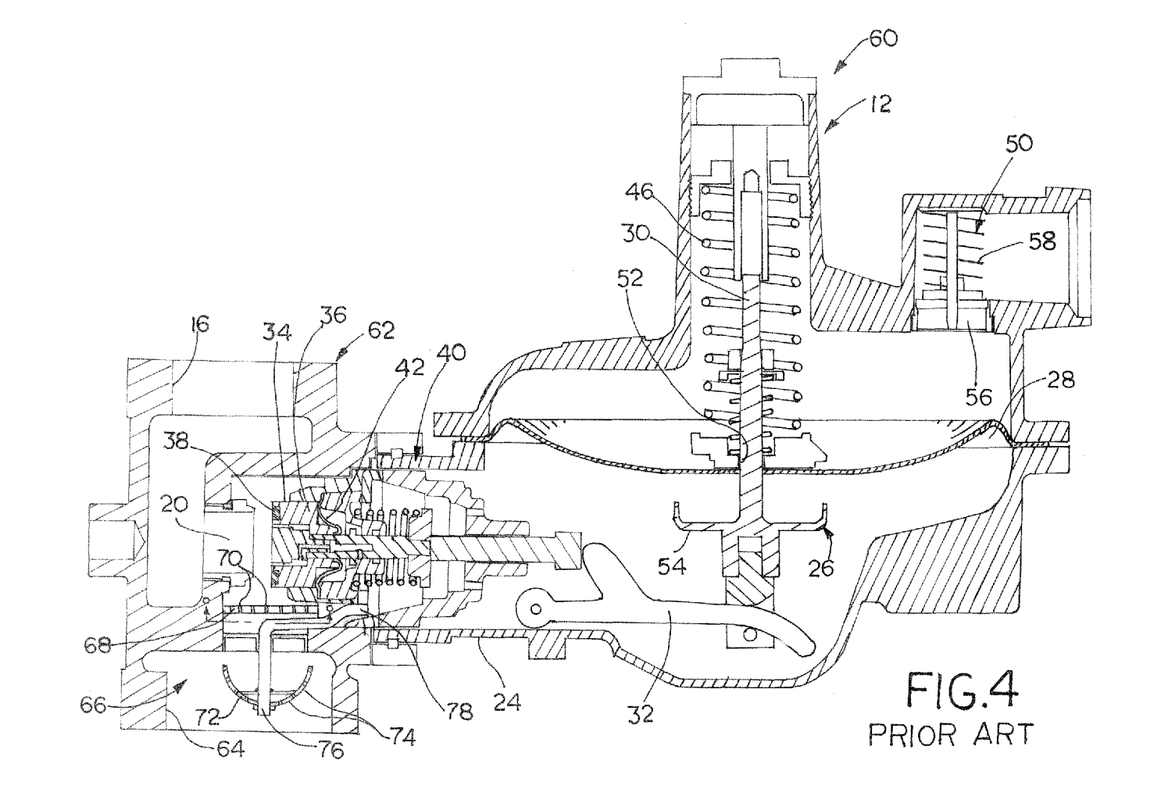
FIG. 4 is a side cross-sectional view of a gas regulator having a flow conditioning subassembly in a full open position.
Figure 5:
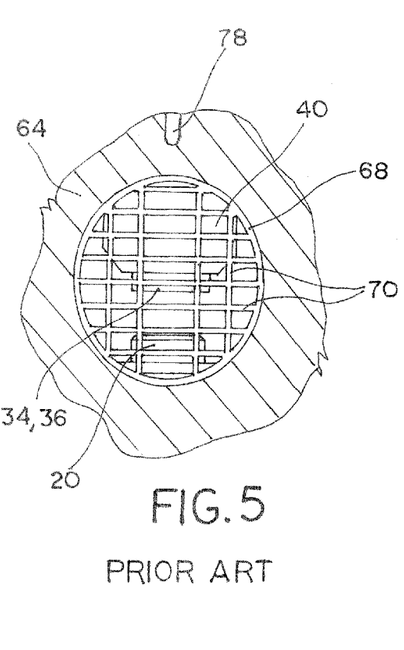
FIG. 5 is a cross-sectional view through line 5-5 of FIG. 4.
Figure 6:
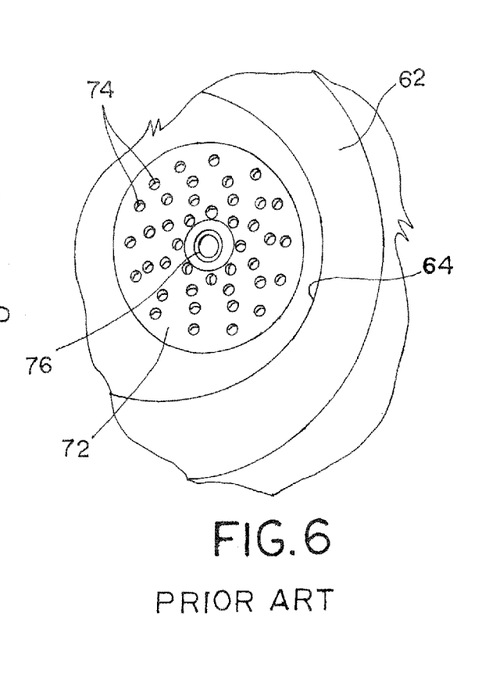
FIG. 6 is an end view through the outlet of the gas regulator of FIG. 4.

Better regulation of the fluid flow and, correspondingly, the downstream pressure, may be achieved by using flow conditioning to artificially raise the amount of fluid volume transferred by a gas regulator. The flow conditioning quickly transitions the fluid from turbulent flow to laminar flow to provide for more accurate sensing of the downstream pressure. In one example of flow conditioning shown in FIGS. 4-6, a regulator 60 includes a regulator valve 62 having a modified outlet 64 configured to receive a flow control subassembly 66. The flow control subassembly 66 includes a screen 68 having a plurality of baffles 70, a semicircular sieve 72 with a plurality of holes 74 therethrough, and a central sensing tube 76. An inward end of the sensing tube 76 in placed in fluid communication with the interior of the actuator 12. The fluid flow is converted from turbulent flow to laminar flow as the fluid passes between the baffles 70 and through the holes 74, resulting in a more accurate measurement of the downstream pressure at the sense point of the sensing tube 76. While being effective at conditioning the flow, the subassembly 66 is relatively expensive to fabricate. Moreover, the subassembly 66 requires modifications to the standard regulator valve body and is not readily transitioned to other body sizes. Therefore, a need exists for flow conditioning in a gas regulator that is less expensive to implement and readily implemented in a variety of regulator valve sizes and body types.

SUMMARY

The present invention provides a fluid regulating device that may include a valve having an inlet, an outlet, and a valve port disposed between the inlet and the outlet. The regulator may also include an actuator coupled to the valve and comprising a valve disc, with the valve disc disposed within the valve and adapted for displacement between a closed position engaging the valve port and an open position disposed away from the valve port. A Pitot tube of the regulator may have a first end disposed within the outlet of the valve and a second end in fluid communication with an interior of the actuator to place the interior of the actuator in fluid communication with the outlet of the valve. The actuator may be configured to cause the valve disc to move toward the valve port when the pressure at the outlet increases and to cause the valve disc to move away from the valve port when the pressure at the outlet decreases to maintain a pressure downstream of the fluid regulating device approximately equal to a setpoint pressure. Additionally, the regulator may include a housing disposed in the valve and comprising a generally cylindrical first portion disposed proximate the actuator, a generally cylindrical second portion disposed proximate the valve port, and an opening through a sidewall of the second portion and disposed between the valve port and the outlet of the valve.

In a further aspect of the regulator, a partial obstruction, such as a plurality of baffles or a mesh screen, may be disposed within the opening of the second portion of the housing, with a flow of fluid through the valve port passing through the partial obstruction and to the outlet of the valve. The partial obstruction may cause a turbulent fluid flow within the second portion of the housing to convert to a laminar fluid flow at the first end of the Pitot tube. In another aspect of the regulator, the second portion of the housing may have an inner diameter that is sized and configured to slidably receive the valve disc when the valve disc moves between the open and closed positions such that the valve disc and the second portion of the housing cooperate to direct a flow of fluid from the valve port through the opening and to the outlet.

In a still further aspect, the regulator may include a balancing diaphragm operatively connected to the valve disc and having a first side in fluid communication with an upstream pressure of fluid flowing through the valve port and into the second portion of the housing. The upstream pressure may apply a force to the valve disc in the direction of the open position, and the upstream pressure acting on the first side of the balancing diaphragm may apply a force to the valve disc in the direction of the closed position and approximately equal to the force of the upstream pressure on valve disc.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 7:
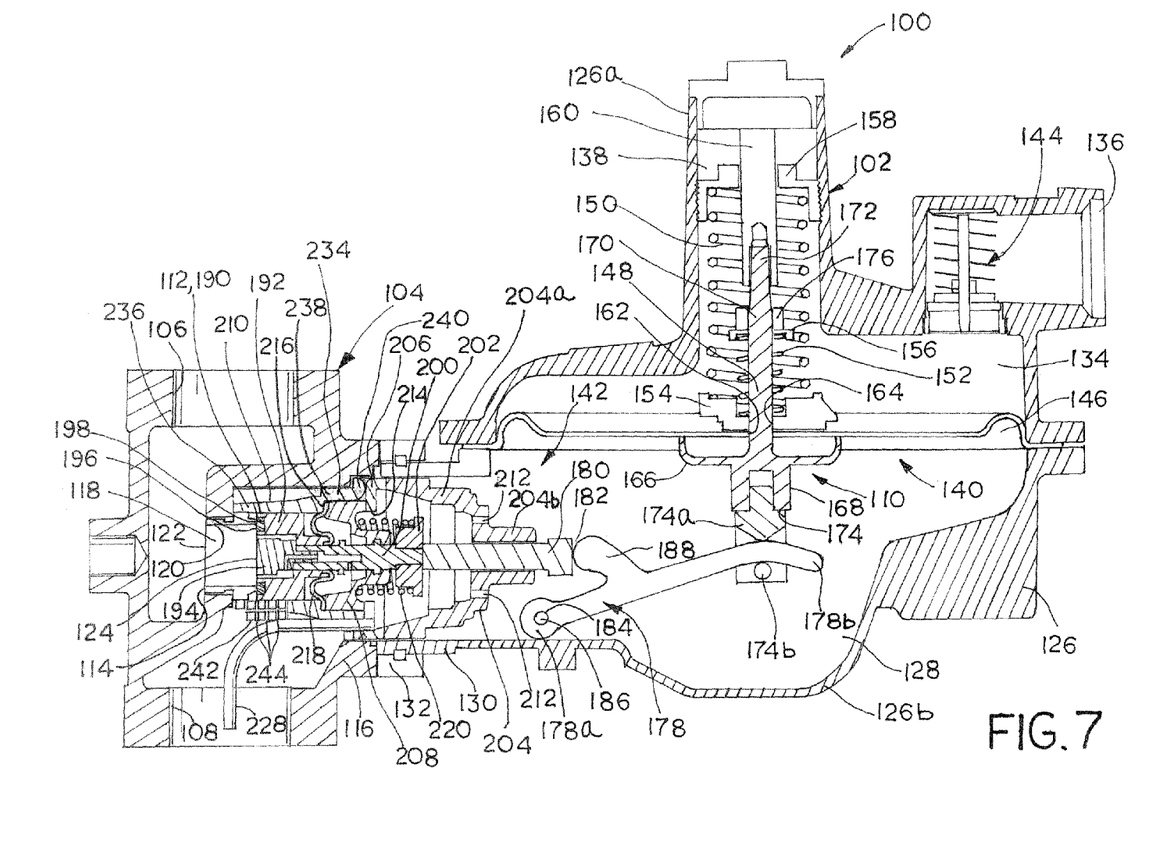
FIG. 7 is a side cross-sectional view of a gas regulator having flow conditioning in accordance with the present disclosure in a closed position.
Figure 8:
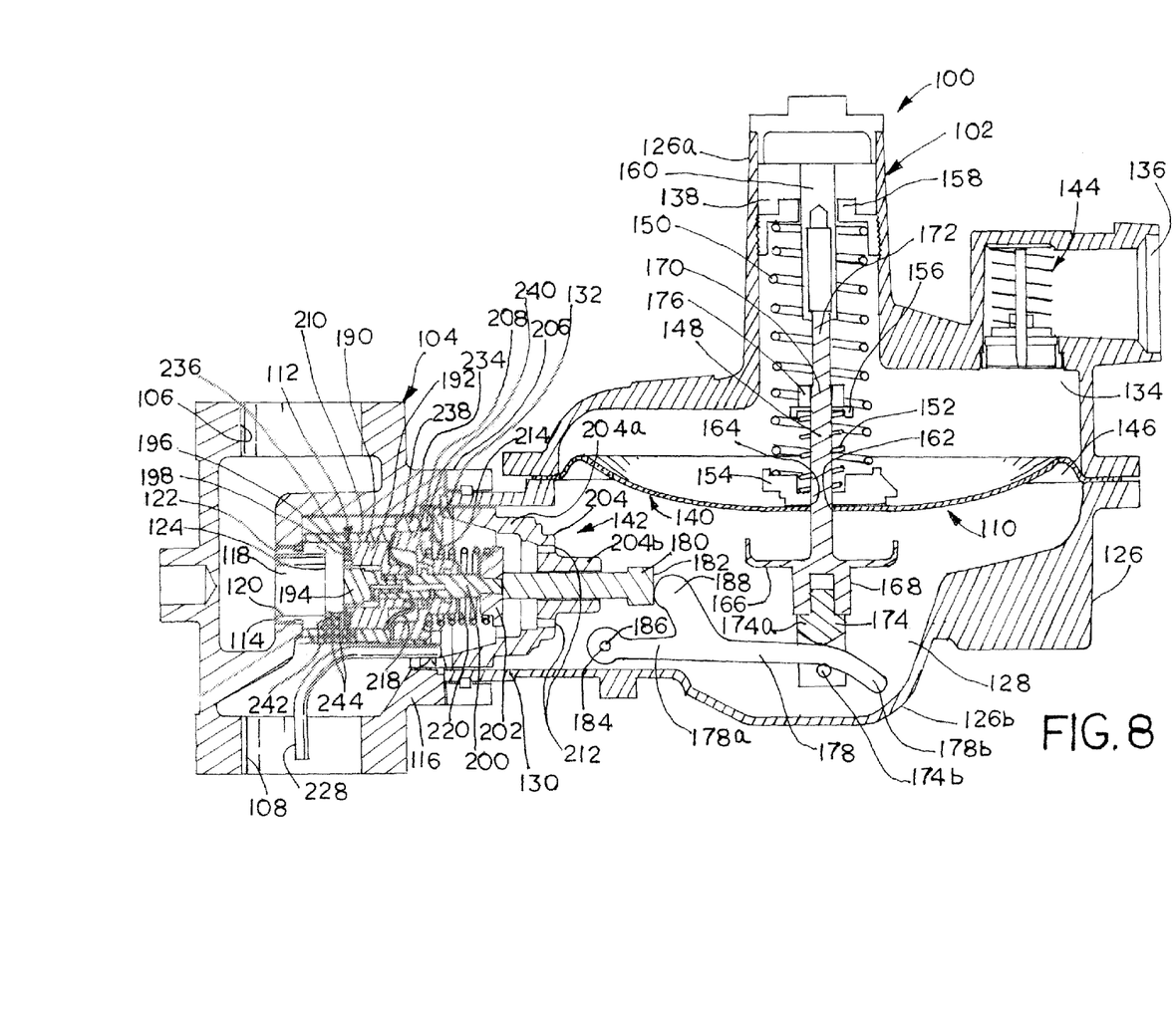
FIG. 8 is a side cross-sectional view of the gas regulator of FIG. 7 in a full open position.
Figure 9:
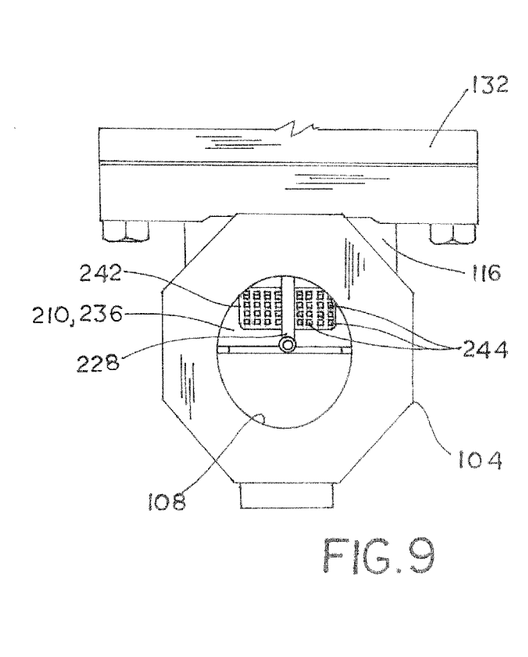
FIG. 9 is an end view through the outlet of the gas regulator of FIG. 8.

FIGS. 7-9 depict a gas regulator 100 constructed in accordance with one embodiment of the present invention. The gas regulator 100 generally comprises an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 110 having a control element 112. During a first or normal operational mode, the control assembly 110 senses the pressure at the outlet 108 of the regulator valve 104, i.e., the outlet pressure, and controls a position of the control element 112 such that the outlet pressure approximately equals a predetermined setpoint or control pressure. Additionally, upon the occurrence of a failure in the system, the regulator 100 performs a relief function that is generally similar to the relief function described above with reference to the regulator 10 depicted in FIGS. 1-3.

With continued reference to FIG. 7, the regulator valve 104 defines a throat 114 and a valve mouth 116. The throat 114 is disposed between the inlet 106 and the outlet 108. A valve port 118 is disposed in the throat 114 and defines a bore 120 having an inlet 122 and an outlet 124. Gas must travel through the bore 120 in the valve port 118 to travel between the inlet 106 and the outlet 108 of the regulator valve 104. The valve port 118 is removable from the regulator valve 104 such that it may be replaced with a different valve port having a bore of a different diameter or configuration to tailor operational and flow characteristics of the regulator valve 104 to a specific application. In the disclosed embodiment, the valve mouth 116 defines an opening disposed along an axis that is generally perpendicular to an axis of the inlet 106 and outlet 108 of the regulator valve 104.

The actuator 102 includes a housing 126 and the control assembly 110, as mentioned above. The housing 126 includes an upper housing component 126a and a lower housing component 126b secured together with a plurality of fasteners, for example. The lower housing component 126b defines a control cavity 128 and an actuator mouth 130. The actuator mouth 130 is connected to the valve mouth 116 of the regulator valve 104 to provide fluid communication between the actuator 102 and the regulator valve 104. In the disclosed embodiment, the regulator 100 includes a collar 132 securing the mouths 116, 130 together. The upper housing component 126a defines a relief cavity 134 and an exhaust port 136. The upper housing component 126a further defines a tower portion 166 for accommodating a portion of the control assembly 110, as will be described.

The control assembly 110 includes a diaphragm subassembly 140, a disc and balancing subassembly 142, and a release valve 144. The diaphragm subassembly 140 includes a diaphragm 146, a piston 148, a control spring 150, a relief spring 152, a combination spring seat 154, a relief spring seat 156, a control spring seat 158, and a piston guide 160.

More particularly, the diaphragm 146 includes a disc-shaped diaphragm defining an opening 162 through a central portion thereof. The diaphragm 146 is constructed of a flexible, substantially air-tight, material and its periphery is sealingly secured between the upper and lower housing components 126a, 126b of the housing 126. The diaphragm 146 therefore separates the relief cavity 134 from the control cavity 128.

The combination spring seat 154 is disposed on top of the diaphragm 146 and defines an opening 164 disposed concentric with the opening 162 in the diaphragm 146. As depicted in FIG. 7, the combination spring seat 154 supports the control spring 150 and the relief spring 152.

The piston 148 of the disclosed embodiment includes a generally elongated rod-shaped member having a sealing cup portion 166, a yoke 168, a threaded portion 170, and a guide portion 172. The sealing cup portion 166 is concaved and generally disc-shaped and extends circumferentially about a mid-portion of the piston 148, and is located just below the diaphragm 146. The yoke 168 includes a cavity adapted to accommodate a coupler 174 which connects to a portion of the disc and balancing subassembly 142 to enable attachment between the diaphragm subassembly 140 and the disc and balancing subassembly 142, as will be described.

The guide portion 172 and the threaded portion 170 of the piston 148 are disposed through the openings 152, 164 in the diaphragm 146 and the combination spring seat 154, respectively. The guide portion 172 of the piston 148 is slidably disposed in a cavity in the piston guide 160, which maintains the axial alignment of the piston 148 relative to the remainder of the control assembly 110. The relief spring 152, the relief spring seat 156, and a nut 176 are disposed on the threaded portion 170 of the piston 148. The nut 176 retains the relief spring 152 between the combination spring seat 154 and the relief spring seat 156. The control spring 150 is disposed on top of the combination spring seat 154, as mentioned, and within the tower portion 166 of the upper housing component 126a. The control spring seat 158 is threaded into the tower portion 166 and compresses the control spring 150 against the combination spring seat 154. In the disclosed embodiment, the control spring 150 and the relief spring 152 include compression coil springs. Accordingly, the control spring 150 is grounded against the upper housing component 126a and applies a downward force to the combination spring seat 154 and the diaphragm 146. The relief spring 152 is grounded against the combination spring seat 154 and applies an upward force to the relief spring seat 156, which in turn is applied to the piston 148. In the disclosed embodiment, the force generated by the control spring 150 is adjustable by adjusting the position of the control spring seat 158 in the tower portion 166, and therefore the control pressure of the regulator 100 is also adjustable.

The control spring 150 acts against the pressure in the control cavity 128, which is sensed by the diaphragm 146. As stated, this pressure is the same pressure as that which exists at the outlet 108 of the regulator valve 104. Accordingly, the force applied by the control spring 150 sets the outlet pressure to a desired setpoint or control pressure for the regulator 100. The diaphragm subassembly 140 is operably coupled to the disc and balancing subassembly 142, as mentioned above, via the yoke portion 172 of the piston 148 and the coupler 174, and by a control arm 178.

The disc and balancing subassembly 142 includes an actuator stem 180 that is engaged by the control arm 178 to move the control element 112 between the open and closed positions as the diaphragm 146 flexes due to variations in the downstream pressure. Specifically, the actuator stem 180 is a generally linear rod having an engagement surface 182. The control arm 178 is a slightly curved rod and includes a fulcrum end 178a and a free end 178b. The fulcrum end 178a includes an aperture 184 receiving a pivot pin 186 carried by the lower housing component 126b. The fulcrum end 178a also includes a finger 188 having a rounded end and engaging the surface 182 of the actuator stem 180. The free end 178b is received between a top portion 174a and a pin 174b of the coupler 174 that is attached to the yoke 168 of the piston 148. Thus, the coupler 174 and the control arm 178 operably connect the disc and balancing subassembly 142 to the diaphragm subassembly 140.

The control element 112 of the disc and balancing subassembly 142 is operatively connected to the actuator stem 180, and includes a valve disc 190 having an outer disc portion 192 and a coaxial inner disc portion 194. The outer disc portion 192 includes a recess receiving a sealing insert 196 having a sealing surface 198 that engages the outlet 124 of the valve port 118 to cut off the fluid flow through the regulator valve 104. The disc portions 192, 194 are connected to the actuator stem 180 by balanced port stem 200 and a balancing spring seat 202, and the combined elements are supported for linear movement by a stem guide 204, a retainer plate 206, a balancing diaphragm retainer 208 and a balancing port housing 210. The stem guide 204 includes a generally cylindrical outer portion 204a sized and configured to fit within the actuator mouth 130 of the lower housing component 126b, and a generally cylindrical inner portion 204b that is sized and configured to slidably retain the actuator stem 180. The stem guide 204 further includes channels 212 therethrough forming a portion of the path placing the outlet 108 in fluid communication with control cavity 128 as discussed further below.

The stem guide 204 engages the retainer plate 206, which is disposed between the stem guide 204 and balanced port housing 210, to hold the retainer plate 206 and balanced port housing 210 in place within the valve mouth 116. The retainer plate 206 is generally circular and includes a central opening 214 through which the balanced port stem 200 passes. The balanced port housing 210 is generally cylindrical and hollow, and extends toward the throat 114 and over the outlet 124 of the valve port 118. The diaphragm retainer 206 is disposed within the balanced port housing 210 and the opening 214 of the retainer plate 206, and is held in place between a surface of the retainer plate 206 and an inner shoulder 216 of the balanced port housing 210. A disc-shaped balancing diaphragm 218 having a central opening is provided within the balanced port housing 210. The balancing diaphragm 218 is constructed of a flexible, substantially air-tight, material and its periphery is secured between the retainer plate 206 and the shoulder 216. The inner edge at the central opening of the balancing diaphragm 218 is sealingly secured between the outer disc portion 192 and the balanced port stem 200. The valve disc 190, balanced port stem 200 and the actuator stem 180 are biased toward the open position of the regulator valve 104 by a balancing spring 220 disposed between the spring seat 202 and a seating surface 222 of the diaphragm retainer 208.

The balancing diaphragm 218 provides a force on the valve disc 190 in the direction of the valve port 118 to compensate for the force applied to the valve disc 190 due to the upstream pressure of the fluid passing through the valve port 118. The inner disc portion 194 has an outer diameter that is smaller than an inner diameter of the outer disc portion 192 to allow fluid to enter a passage 224 of the inner disc portion 194 and a corresponding passage 226 within the balanced port stem 200. The passage 226 opens into the interior of the diaphragm retainer 208 thereby placing the surface of the balancing diaphragm 218 opposite the valve port 118 in fluid communication with the upstream pressure bearing on the valve disc 190. The components of the disc and balancing subassembly 142 are configured so that the force applied by the balancing diaphragm 218 is approximately opposite and equal to the force of the upstream pressure on the valve disc 190 to eliminate any influence of the upstream pressure on the diaphragm subassembly 140 and thereby allowing for more accurate control of the downstream pressure by the gas regulator 100.

As discussed above, a Pitot tube 228 having a sensing point within the outlet 108 of the regulator valve 104 provides the downstream pressure feedback to the actuator 102. The Pitot tube 228 extends into the valve mouth 116 and passes through openings 230, 232 through the balanced port housing 210 and the retainer plate 206, respectively. The Pitot tube 228 provides the downstream pressure to the interior of the stem guide 204, and to the control cavity 128 via the channels 212 of the stem guide 204.

With continued reference to FIGS. 7, 7A, 8 and 8A, the balanced port housing 210 of the disc and balancing subassembly 142 includes a first portion 234, a second portion 236 and a transition portion 238. The first and second portions 234, 236 are generally cylindrical and axially aligned. The first portion 234 has an outer diameter that is sized and configured to be received within the valve mouth 116 within generally tight tolerances, and has an inner diameter that is sized and configured to receive the diaphragm retainer 208 within similar tolerances. The first portion 234 may further include a radially extending flange 240 that may be engaged by a corresponding shoulder of the inner surface of the valve mouth 116 to properly position the balanced port housing 210 and the other components of the disc and balancing subassembly 142. The passage 224 for the Pitot tube 228 may pass through the first portion 234 at a position oriented proximate the outlet 108. The second portion 236 of the balanced port housing 210 may have an outer diameter that is smaller than the outer diameter of the first portion 234, and may have an inner diameter that is sized and configured to receive the valve disc 190 within generally tight tolerances. The valve disc 190 is slidably received within the second portion 236 of the balanced port housing 210 in a manner that substantially prevents fluid from flowing between the inner surface of the second portion 236 and the outer surface of the outer disc portion 192 and into the cavity between the valve disc 190 and the balancing diaphragm 218. If necessary, an additional sealing mechanism, such as an O-ring seal, may be provided to prevent such flow while allowing the valve disc 190 to slide within the second portion 236. The valve disc 190 effectively serves to block, restrict, or substantially prevent the flow of fluid through the disc and balancing subassembly 142 and into the actuator 102. The transition portion 238 is disposed axially between the first and second portions 234, 236. The transition portion 238 is located at the point where the inner diameter of the balanced port housing 210 narrows from that of the first portion 234 to that of the second portion 236, and thereby forms the shoulder 216 that secures the balancing diaphragm 216 along with the diaphragm retainer 208.

Figure 7A:
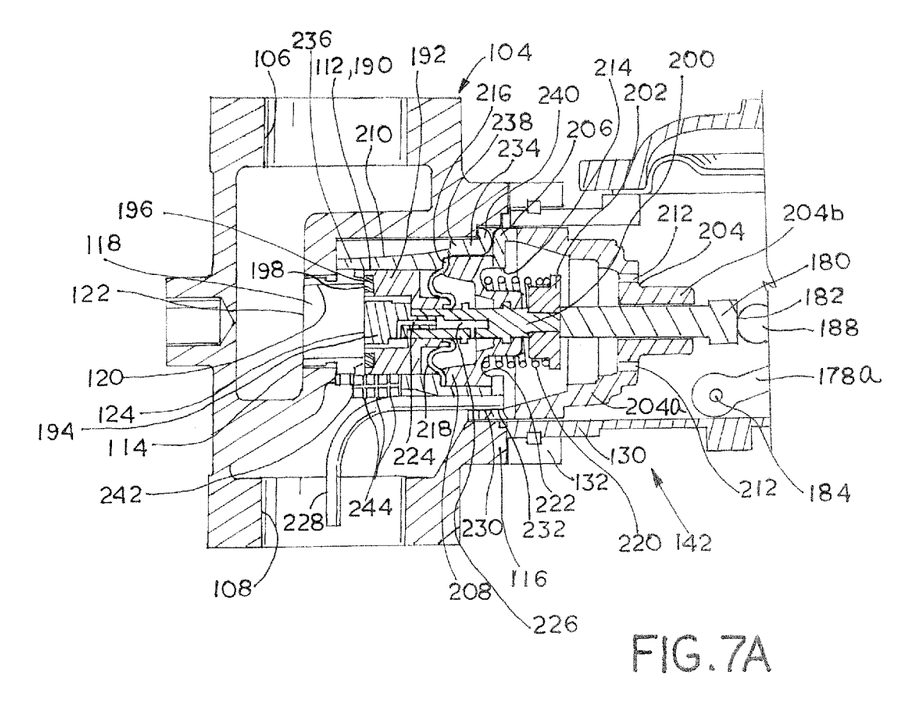
FIG. 7A is a side cross-sectional view of the regulator valve and balanced trim of the gas regulator of FIG. 7.

In the disclosed embodiment, the second portion 234 of the balanced port housing 210 defines a downstream flow opening 242 through a sidewall thereof. The sidewall at the opening 242 in the second portion 234 may extend away from the remainder of the balanced port housing 210 such that the wall of the opening does not extend past the outer diameter of the first portion 234, thereby still allowing the housing to be inserted into the valve mouth 116 during assembly. When the balanced port housing 210 is inserted into valve mouth 116, the housing 210 is oriented such that the opening 242 faces the outlet 108 of the regulator valve 104. If necessary, the valve mouth 116 and/or the flange 240 of the first portion 234 may be configured with appropriate alignment mechanisms to ensure the proper orientation of the opening 242. With the balanced port housing 210 installed as depicted, the valve port 118, the second portion 236, the opening 242 and the outlet 108 define a flow path directing the fluid toward the downstream portion of the fluid distribution system.

As discussed previously, the fluid flowing through the regulator valve 104 may experience turbulent flow as the fluid passes through the outlet 124 of the valve port 118 and impacts the valve disc 190, and the turbulent flow can continue past the outlet 108 of the regulator valve 104 and the sensing point of the Pitot tube 228. In order to condition the fluid flow and convert the turbulent flow to laminar flow upstream of the sensing point of the Pitot tube 228, the opening 242 through the sidewall of the housing 210 may include a partial obstruction across the opening 242, such as a plurality of baffles or a screen, through which the fluid flow passes. In the illustrated embodiment, the partial obstruction includes a plurality of baffles 244 integrally formed in second portion 236 of the housing 210 at the opening 242. The baffles 244 may extend both vertically and horizontally as illustrated in FIG. 9. Alternatively, the baffles 244 may be formed in one direction only, or may be oriented at other angles relative to the axis of movement of the valve disc 190. The specific configuration of the baffles 244, including the number, thickness, density and orientation of the baffles 244, may be selected as necessary to achieve a desired laminar flow through the outlet 108 of the regulator valve 104 without causing an undue pressure drop across the baffles 244.

Alternative embodiments of partial obstructions capable of the converting turbulent flow to laminar flow within the regulator valve 104 will be apparent to those skilled in the art. For example, the opening 242 may be configured to receive a partial obstruction in the form of a screen having a plurality of baffles similar to the configuration of the screen 68 shown in FIGS. 4 and 5. As a further alternative, inserts similar to the screen 68 may be formed from a wire mesh, a perforated sheet of material or other type of partial obstruction wherein fluid flows over a surface and through the obstruction, and turbulent flow, where present, converts to laminar flow. The configuration of the partial obstruction necessary to convert turbulent flow to laminar flow may vary with the characteristics of the fluid passing through the regulator valve 104, and a separate insertable screen may provide an additional level of flexibility or customization in the regulator 100 without replacing the entire housing 210. Moreover, the performance of the partial obstruction may degrade over time as the fluid erodes the material of the obstruction or deposits on the surface of the obstruction. Maintenance of the regulator 100 may be facilitated by the ability to replace the obstruction instead of requiring the replacement of the entire housing 210. These and further alternative partial obstruction mechanisms, both integrally and separately formed with the balanced port housing 210, are contemplated by the inventors as having use in regulators in accordance with the present disclosure.

FIGS. 7 and 7A depict the regulator 100 of the present embodiment with the valve disc 190 in a closed position. Therefore, the valve disc 190 is slidably disposed within the second portion 236 of the housing 210 such that the sealing surface 198 sealingly engages the outlet 124 of the valve port 118. So configured, gas does not flow through the valve port 118 and the regulator valve 104. This configuration is achieved because the outlet pressure, which corresponds to the pressure in the control cavity 128 of the housing 126 and sensed by the diaphragm 146, is greater than the force applied by the control spring 150. Accordingly, the downstream pressure at the outlet 108 forces the diaphragm 146 and the piston 148 into the closed position.

Figure 8A:
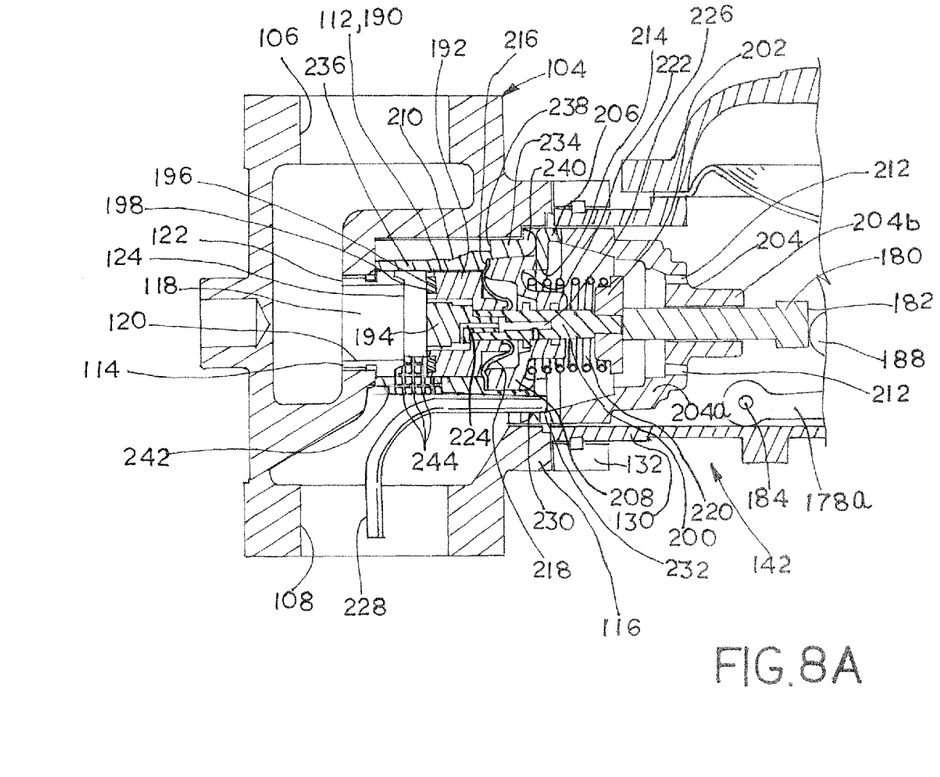
FIG. 8A is a side cross-sectional view of the regulator valve and balanced trim of the gas regulator of FIG. 8.

When an operating demand is placed on the gas distribution system, e.g., a user begins operating an appliance such as a furnace, a stove, etc., the appliance draws gas from the outlet 108 and correspondingly the control cavity 128 of the regulator 100, thereby reducing the pressure that is sensed by the diaphragm 146. As the pressure sensed by the diaphragm 146 decreases, a force imbalance occurs between a control spring force and an outlet pressure force on the diaphragm 146 such that the control spring 150 expands and displaces the diaphragm 146 and piston 148 downward relative to the housing 126. This causes the lever 180 to pivot in the clockwise direction about the pivot pin 186, which in turn rotates the finger 188 relative to the surface 182 of the actuator stem 180. This allows the actuator stem 180 and the valve disc 190 to move away from the outlet 124 of the valve port 118 due to the force of the balancing spring 220 to open the regulator valve 104 as shown in FIGS. 8, 8A and 9.

Once the valve port 118 is opened, the gas distribution system is able to deliver gas to the downstream appliance through the regulator valve 104 at a control pressure that is set by the control spring 150. Additionally, the diaphragm subassembly 140 continues to sense the outlet pressure of the regulator valve 104. As long as the outlet pressure remains approximately equal to the setpoint pressure, the control assembly 110 will keep the valve disc 190 in this same general position. However, if the outlet flow, i.e., the demand, decreases, thereby increasing the outlet pressure above the setpoint pressure set by the control spring 150, the diaphragm 146 senses the increased outlet pressure and moves upward against the bias of the control spring 150. Alternatively, if the outlet flow, i.e., the demand, increases, thereby decreasing the outlet pressure below the control pressure, the diaphragm 146 senses the decreased outlet pressure and the spring 150 biases the diaphragm 146 and piston 148 downward to open the regulator valve 104. Thus, slight deviations from the outlet or control pressure cause the control assembly 110 to react and adjust the position of the control element 112.

With the valve disc 190 disengaged from the outlet 124 of the valve port 118, the gas flows into the second portion 236 of the balanced port housing 210. Due to the configurations of the inner surface of the second portion 236, the valve disc 190 and the opening 242, the fluid is forced through the opening 242 and the baffles 244 disposed therein with relatively little divergence form the flow path. As the fluid passes through the baffles 244, turbulent fluid flow, to the extent any turbulence is present, is converted to laminar flow. Consequently, when the fluid reaches the outlet 108 of the regulator valve 104 and the sensing point of the Pitot tube 228, the smooth flow of the fluid allows for improved measurement of the downstream pressure and, correspondingly, improved regulation of the downstream pressure by the control assembly 110.

While the preceding text sets forth a detailed description of numerous different embodiments of the invention, it should be understood that the legal scope of the invention is defined by the words of the claims set forth at the end of a patent claiming priority hereto. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed:

1. A fluid regulating device, comprising:
   a valve having an inlet, an outlet, and a valve port disposed between the inlet and the outlet;
   an actuator coupled to the valve and comprising a valve disc, the valve disc adapted for displacement between a closed position engaging the valve port and an open position disposed away from the valve port;
   a Pitot tube having a first end in fluid communication with the outlet of the valve and a second end in fluid communication with an interior of the actuator to place the interior of the actuator in fluid communication with the outlet of the valve, wherein the actuator is configured to cause the valve disc to move toward the valve port when the pressure at the outlet increases and to cause the valve disc to move away from the valve port when the pressure at the outlet decreases to maintain a pressure downstream of the fluid regulating device approximately equal to a setpoint pressure; and
   a balanced port housing disposed in the valve and comprising a generally cylindrical first portion disposed proximate the actuator, a generally cylindrical second portion disposed proximate the valve port, and an opening through a sidewall of the second portion and disposed between the valve port and the outlet of the valve; and
   a partial obstruction disposed within the opening of the second portion of the housing, wherein a flow of fluid through the valve port passes through the partial obstruction and to the outlet of the valve;
   wherein the valve disc is slidably disposed within the second portion of the balanced port housing.

2. A fluid regulating device in accordance with claim 1, wherein the partial obstruction causes a turbulent fluid flow within the second portion of the housing to convert to a laminar fluid flow at the first end of the Pitot tube.

3. A fluid regulating device in accordance with claim 1, wherein the partial obstruction is integrally formed with the housing.

4. A fluid regulating device in accordance with claim 1, wherein the partial obstruction comprises a plurality of baffles extending across the opening of the second portion.

5. A fluid regulating device in accordance with claim 4, wherein the baffles comprise a first set of baffles oriented parallel to an axis of movement of the valve disc and a second set of baffles oriented perpendicular to the axis of movement of the valve disc.

6. A fluid regulating device in accordance with claim 1, wherein the partial obstruction comprises a mesh screen.

7. A fluid regulating device in accordance with claim 1, comprising a balancing diaphragm operatively connected to the valve disc and having a first side in fluid communication with an upstream pressure of fluid flowing through the valve port and into the second portion of the housing, wherein the upstream pressure applies a force to the valve disc in the direction of the open position, and the upstream pressure acting on the first side of the balancing diaphragm applies a force to the valve disc in the direction of the closed position and approximately equal to the force of the upstream pressure on valve disc.

8. A fluid regulating device in accordance with claim 1, wherein the housing is removably disposed within the valve.

9. A fluid regulating device, comprising:
   a valve having an inlet, an outlet, and a valve port disposed between the inlet and the outlet;
   an actuator coupled to the valve and comprising a valve disc, the valve disc adapted for displacement between a closed position adjacent to the valve port and an open position spaced away from the valve port;
   a Pitot tube having a first end in fluid communication with the outlet of the valve and a second end in fluid communication with an interior of the actuator to place the interior of the actuator in fluid communication with the outlet of the valve, wherein the actuator is configured to cause the valve disc to move toward the valve port when the pressure at the outlet increases and to cause the valve disc to move away from the valve port when the pressure at the outlet decreases to maintain a pressure downstream of the fluid regulating device approximately equal to a setpoint pressure;
   a balanced port housing carried by the valve adjacent to the valve port and comprising a first portion having a cylindrical wall disposed proximate the actuator and engaging an inner wall of the valve to position the housing within the valve, and a second portion having a cylindrical sidewall disposed proximate the valve port, the cylindrical sidewall of the second portion defining an opening disposed between the valve port and the outlet of the valve, the cylindrical sidewall slidably receiving the valve disc when the valve disc moves between the open and closed positions, thereby substantially restricting a flow of fluid from the valve port to the actuator and facilitating the flow of fluid from the valve port to the outlet of the valve via the opening; and
   a partial obstruction disposed within the opening of the second portion of the housing, wherein a flow of fluid through the valve port passes through the partial obstruction and to the outlet of the valve.

10. A fluid regulating device in accordance with claim 9, wherein the partial obstruction causes a turbulent fluid flow within the second portion of the housing to convert to a laminar fluid flow at the first end of the Pitot tube.

11. A fluid regulating device in accordance with claim 9, wherein the partial obstruction is integrally formed with the housing.

12. A fluid regulating device in accordance with claim 9, wherein the partial obstruction comprises a plurality of baffles extending across the opening of the second portion.

13. A fluid regulating device in accordance with claim 12, wherein the baffles comprise a first set of baffles oriented parallel to an axis of movement of the valve disc and a second set of baffles oriented perpendicular to the axis of movement of the valve disc.

14. A fluid regulating device in accordance with claim 9, wherein the partial obstruction comprises a mesh screen.

15. A fluid regulating device in accordance with claim 9, comprising a balancing diaphragm operatively connected to the valve disc and having a first side in fluid communication with an upstream pressure of fluid flowing through the valve port and into the second portion of the housing, wherein the upstream pressure applies a force to the valve disc in the direction of the open position, and the upstream pressure acting on the first side of the balancing diaphragm applies a force to the valve disc in the direction of the closed position and approximately equal to the force of the upstream pressure on valve disc.

16. A fluid regulating device in accordance with claim 9, wherein the housing is removably disposed within the valve.

17. A fluid regulating device, comprising:
   a valve having an inlet, an outlet, and a valve port disposed between the inlet and the outlet;

an actuator coupled to the valve and comprising a valve disc, the valve disc adapted for displacement between a closed position engaging the valve port and an open position disposed away from the valve port;

a balancing diaphragm operatively connected to the valve disc and having a first side in fluid communication with an upstream pressure of fluid flowing through the valve port, wherein the upstream pressure applies a force to the valve disc in the direction of the open position, and the upstream pressure acting on the first side of the balancing diaphragm applies a force to the valve disc in the direction of the closed position and approximately equal to the force of the upstream pressure on valve disc;

a Pitot tube having a first end in fluid communication with the outlet of the valve and a second end in fluid communication with an interior of the actuator to place the interior of the actuator in fluid communication with the outlet of the valve, wherein the actuator is configured to cause the valve disc to move toward the valve port when the pressure at the outlet increases and to cause the valve disc to move away from the valve port when the pressure at the outlet decreases to maintain a pressure downstream of the fluid regulating device approximately equal to a setpoint pressure;

a balanced port housing disposed in the valve and comprising a generally cylindrical first portion disposed proximate the actuator, a generally cylindrical second portion disposed proximate the valve port, and an opening through a sidewall of the second portion and disposed between the valve port and the outlet of the valve;

a partial obstruction disposed within the opening of the second portion of the housing, wherein a flow of fluid through the valve port passes through the partial obstruction and to the outlet of the valve; and wherein the second portion of the housing has an inner diameter that is sized and configured to slidably receive the valve disc when the valve disc moves between the open and closed positions such that the valve disc and the second portion of the housing cooperate to direct a flow of fluid from the valve port through the opening and to the outlet.

18. A fluid regulating device in accordance with claim 17, wherein the partial obstruction causes a turbulent fluid flow within the second portion of the housing to convert to a laminar fluid flow at the first end of the Pitot tube.

19. A fluid regulating device in accordance with claim 18, wherein the partial obstruction is integrally formed with the housing.

20. A fluid regulating device in accordance with claim 18, wherein the partial obstruction comprises a plurality of baffles extending across the opening of the second portion.

21. A fluid regulating device in accordance with claim 20, wherein the baffles comprise a first set of baffles oriented parallel to an axis of movement of the valve disc and a second set of baffles oriented perpendicular to the axis of movement of the valve disc.

22. A fluid regulating device in accordance with claim 18, wherein the partial obstruction comprises a mesh screen.

23. A fluid regulating device in accordance with claim 17, wherein the balanced port housing is removably disposed within the valve.

* * * * *